United States Patent [19]

Kawasumi

[11] 3,903,459

[45] Sept. 2, 1975

[54] DISK TRIMMER CAPACITOR

[75] Inventor: Kazuo Kawasumi, Suwa, Japan

[73] Assignee: Kabushiki Kaisha Suwa Seikosha, Tokyo, Japan

[22] Filed: May 23, 1974

[21] Appl. No.: 472,888

[30] Foreign Application Priority Data

May 24, 1973 Japan.............................. 48-60878
Sept. 21, 1973 Japan............................ 48-110680

[52] U.S. Cl.......................... 317/249 D; 317/249 R
[51] Int. Cl.............................................. H01g 5/06
[58] Field of Search..................... 317/249 R, 249 D

[56] References Cited
FOREIGN PATENTS OR APPLICATIONS
595,012  11/1947  United Kingdom............ 317/249 D

*Primary Examiner*—E. A. Goldberg
*Attorney, Agent, or Firm*—Waters, Schwartz & Nissen

[57] ABSTRACT

A trimmer capacitor comprising a stator and a rotor rotatably mounted on the stator. The rotor and stator have electrodes mounted respectively thereon and the rotor includes a dielectric body interposed between the electrodes. The stator lead terminal is formed as a separate element and is connected to the stator electrode, the latter being of greater mechanical strength and being received in a recess in the stator dielectric body.

4 Claims, 5 Drawing Figures

FIG. 3
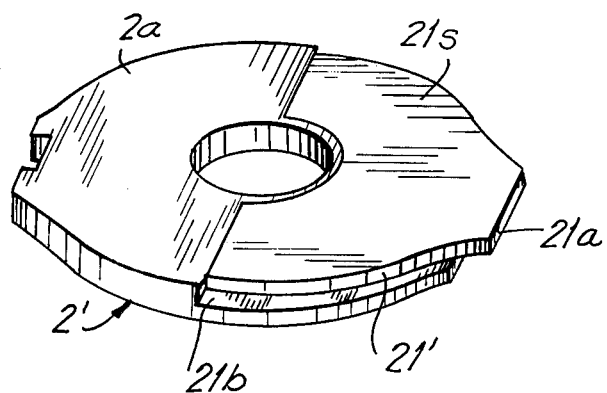
FIG. 4
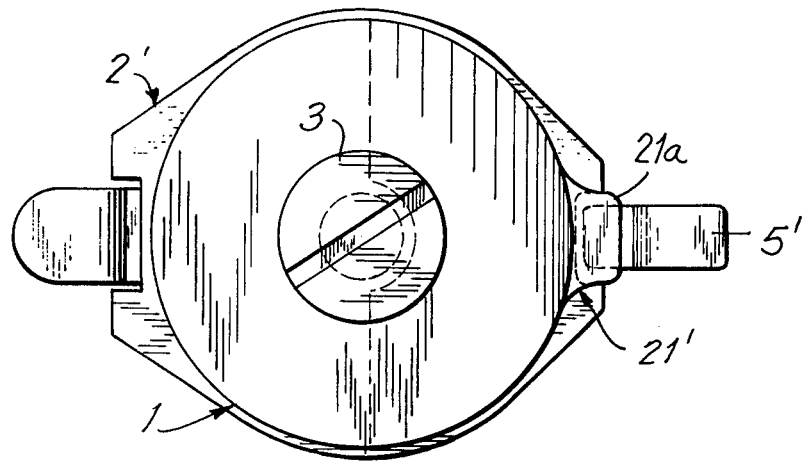
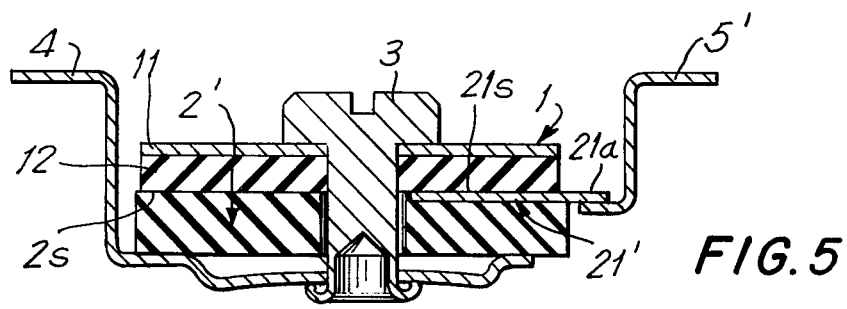
FIG. 5

DISK TRIMMER CAPACITOR

BACKGROUND

1. Field of the Invention

This invention relates to the construction of a small-sized trimmer capacitor.

2. Prior Art

Conventionally, a trimmer capacitor has one lead terminal for each electrode of its dielectric rotor and stator, which lead terminals are generally fixed to the stator. In this conventional structure, the rotor is supported indirectly by the stator through their connecting means, and does not have directly secured thereto any member which can be secured directly to a conductive member to which the trimmer capacitor is to be connected. For this reason, there is the deficiency that the adjusted capacitance can be undesirably varied if an external vibration or shock is imparted to the trimmer capacitor which shifts the rotor with respect to the stator. Such shift can be obtained by reason of the larger diameter D of a central opening in the stator as compared to the diameter $d$ of the control shaft of the connecting means. The magnitude of the shift is within the range of D–$d$.

Furthermore, in a conventional small-sized trimmer capacitor, a metallic plate is used as the stator electrode and the lead terminal of the stator electrode is formed as a part of the metallic plate electrode. The lead terminal is often bent accidentally when the trimmer capacitor is secured conductively to a securing member. If the lead terminal which is secured to the stator is bent, this is apt to cause deformation of the stator electrode and change the condition of its connecting interface with the rotor. In such case, the initial quality cannot be kept. Furthermore, the electrode may sometimes be completely separated from the stator.

If the lead terminal is previously formed with a bent portion and is secured to the stator, there is also the deficiency that the bent portion disturbs the required smoothing abrasive operation on the interface which is to connect with the rotor.

SUMMARY OF THE INVENTION

An object of this invention is to provide a construction for a trimmer capacitor which prevents undesired variation in electrical capacity caused by variation in position of the dielectric and the electrodes of a rotor and a stator.

The invention contemplates a trimmer capacitor comprising a stator, a rotor mounted on said stator, said rotor and stator comprising electrodes mounted respectively thereon, said rotor including a dielectric body interposed between said electrodes, means rotatably coupling said rotor and stator together, and one pair of lead terminals electrically connected to each of said electrodes of the rotor and stator.

Said lead terminals of each pair are in diametric opposition to one another, and the lead terminals of one pair are offset from the lead terminals of the other pair.

Preferably, said lead terminals of said pairs are symmetrically arranged relative to one another.

A further object of the invention is to provide a small-sized trimmer capacitor which can be produced easily and has stable quality and avoids the deficiency regarding separation of the stator electrode body from the stator body due to the lead terminal.

The invention contemplates a trimmer capacitor construction in which a separate lead terminal is connected to said electrode plate of the stator and is formed independently thereof, said electrode plate of the stator having higher mechanical strength than the lead terminal so that application of force to said lead terminal will result in deformation thereof without deformation of the stator electrode plate or change in its connecting interface with the rotor.

In accordance with the invention, said electrode plate of the stator is mounted in a recess provided in the stator body, the stator electrode plate having an outer surface which is coplanar with the outer surface of the stator body, said coplanar outer surface being in interface connection with the dielectric rotor body.

Said stator lead terminal is preferably connected to said stator electrode plate on the surface thereof remote from that which is in interface connection with the dielectric rotor body.

Said stator electrode plate preferably includes a projection extending beyond the stator body, said stator lead terminal being connected to said stator electrode plate at said projection thereof.

BRIEF DESCRIPTION OF THE DRAWING

FIG. 3 is a plan view of one embodiment of this invention;

FIG. 4 is a perspective view of a stator according to this invention;

FIG. 5 is a plan view of the construction of a trimmer capacitor according to the invention using the stator of FIG. 4; and FIG. 6 is a sectional view of the capacitor of FIG. 5.

DETAILED DESCRIPTION

Figure 1:
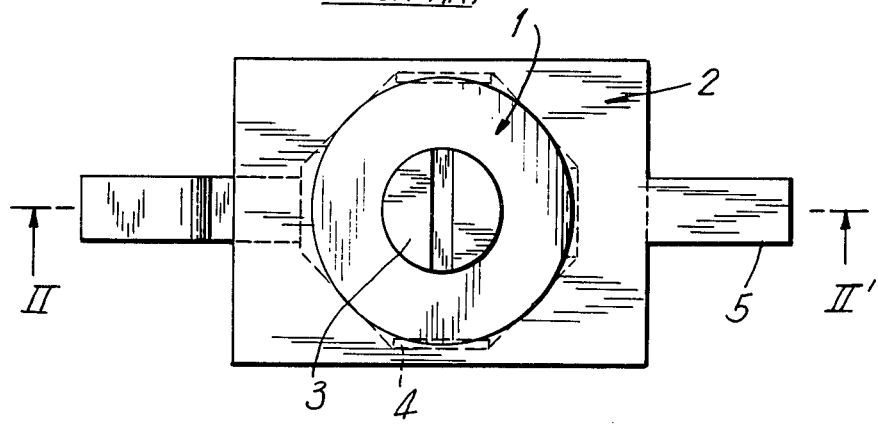
FIG. 1 is a plan view of a conventional trimmer capacitor.
Figure 2:
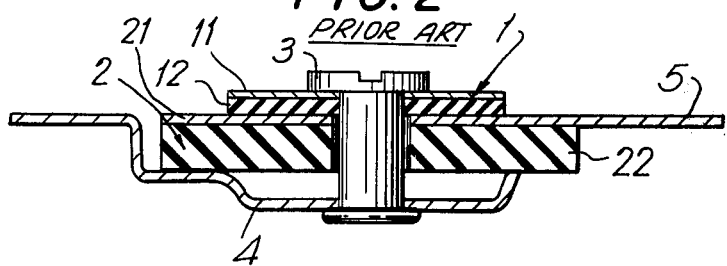
FIG. 2 is a sectional view taken along line II–II' in FIG. 1.

Referring to FIGS. 1 and 2 of the drawing, numeral 1 designates a rotor having an electrode 11 on a dielectric body 12. Numeral 2 refers to a stator having an electrode 21 mounted on an insulator 22, which electrode faces the rotor. A control shaft 3 is fixed to the rotor 1 and in contact with electrode 11 of the rotor 1. A spring 4 serves for pressing the rotor and the stator into engagement, and is electrically connected to the rotor electrode 11 via shaft 3 and serves as a lead terminal. A lead terminal 5 for the stator electrode is fixed to the stator and is integral with electrode 21. The capacitance is adjusted by rotating the control shaft 3. This structure is well-known, but has the deficiency of variation of capacitance caused by relative shifting of the rotor and stator (permitted by the free passage of the shaft 3 within the bore in the stator 2) due to shock or external vibration or the like.

Referring next to FIGS. 3–5 therein is seen rotor 1 of conventional construction with electrode 11 and dielectric body 12, and mounted against rotor 1 is stator 2'. Herein a metallic plate electrode 21' is secured to the stator. The upper surface 2s of the stator and the upper surface 21s of the metallic plate electrode 21' are abraded simultaneously after the metallic plate electrode 21' has been secured to the stator in a recess 21b therein so that they form a common plane. A lead terminal 5' is secured to a projecting portion 21a of the metallic plate electrode in electrically conductive manner by a joining means such as soldering or spot welding. Securing spring 4 is utilized as the lead terminal of the rotor electrode, said spring being connected to the electrode 11 on the rotor through control screw 3 as in the prior art arrangement of FIGS. 1 and 2.

The lead terminal 5' and the metallic plate electrode 21' may be made of either the same or different materials, however, the metallic plate electrode 21' has to be stronger mechanically.

The necessary quality of the capacitor cannot be obtained unless the joining interface of the rotor and the stator are finished so smoothly that mutual molecular attraction occurs. The desired quality can be obtained by separating the electrode portion 21' and the lead terminal 5' so that the electrode portion may be abraded simultaneously with the rest of the stator portion and thereby finished to form a complete common plane therewith. Furthermore, the metallic plate electrode 21' is provided with a larger mechanical strength than the lead terminal 5' so that external impact applied to the lead terminal during mounting of the capacitor to its securing member for usage will be absorbed by the lead terminal, and will not cause deformation nor ripping off of the metallic plate electrode. This contributes to a long-term stability. If the electrode portion 21' is deformed or ripped off during usage it cannot be repaired, and in the construction of the invention where the lead terminal is to undergo the damage or deformation, it is easily replaced by a fresh terminal.

Moreover, the separate lead terminal has the advantage that it can be formed independently, and freely as required. Since the lead terminal is secured to the metallic plate electrode 21' on the surface where the stator is secured, the soldering or spot welding will have no influence on its opposite surface where it contacts the rotor. This also contributes to ease of production and effective operation.

What is claimed is:

1. A trimmer capacitor comprising a stator, a rotor mounted on the stator, and means adjustably connecting the rotor and stator together, said rotor including a dielectric body and an electrode mounted thereon, said stator including a stator body, a metallic electrode plate secured to said body and in contact with the dielectric body of the rotor, and a separate lead terminal connected to said electrode plate of the stator and formed independently thereof, said electrode plate of the stator having higher mechanical strength than the lead terminal so that application of force to said lead terminal will result in deformation thereof without deformation of the stator electrode plate or change in its connecting interface with the rotor.

2. A trimmer capacitor as claimed in claim 1 wherein said electrode plate of the stator is mounted in a recess provided in the stator body, the stator electrode plate having an outer surface which is coplanar with the outer surface of the stator body, said coplanar outer surface being in interface connection with the dielectric rotor body.

3. A trimmer capacitor as claimed in claim 2 wherein said stator lead terminal is connected to said stator electrode plate on the surface thereof remote from that which is in interface connection with the dielectric rotor body.

4. A trimmer capacitor as claimed in claim 3 wherein said stator electrode plate includes a projection extending beyond the dielectric stator body, said stator lead terminal being connected to said stator electrode plate at said projection thereof.

* * * * *